United States Patent [19]
Brownlow et al.

[11] Patent Number: 5,212,757
[45] Date of Patent: May 18, 1993

[54] FATIGUE RESISTANT OPTICAL FIBER

[75] Inventors: Darryl L. Brownlow, Plainfield; David J. DiGiovanni, Scotch Plains; Daryl Inniss, Hillsborough, all of N.J.

[73] Assignee: AT&T Bell Laboratories, Murray Hill, N.J.

[21] Appl. No.: 770,798

[22] Filed: Oct. 3, 1991

[51] Int. Cl.$^5$ .............................................. G02B 6/22
[52] U.S. Cl. ................................... 385/127; 385/124; 385/128; 385/144
[58] Field of Search ............... 385/124, 127, 128, 144

[56] References Cited

U.S. PATENT DOCUMENTS

| | | | |
|---|---|---|---|
| 4,243,298 | 1/1981 | Kao et al. | 350/96.33 |
| 4,396,409 | 8/1983 | Bailey et al. | 65/3.11 |
| 4,666,247 | 5/1987 | MacChesney et al. | 350/96.34 |
| 4,874,222 | 10/1989 | Vacha et al. | 350/96.34 |
| 4,877,306 | 10/1989 | Kar | 350/96.33 |
| 5,033,815 | 7/1991 | Edahiro et al. | 350/96.34 |

OTHER PUBLICATIONS

B. E. Yoldas, *J. Materials Science 12*, (Jan. 1977), "Preparation of glasses and ceramics from metal-organic compounds," pp. 1203-1208.
B. E. Yoldas, *J. Non-Cryst. Solids* 63 (Jan. 1984), "Modifications of Polymer-Gel Structures," pp. 145-154.
D. Inniss and J. T. Krause, *Optical Engineering* 30 (Jun. 1991).
"Hermetic Splice Overcoating," pp. 776-779.
J. E. Ritter, *Outside Plant*, Aug. 1990 "It's New-It's Improved—But is it Worth it?," pp. 62-65.
D. J. Eccleston and J. R. Sicotte, *Telephony*, Jan. 1990, "Fiber must get tough to make it in the lacal loop," pp. 26-28.
D. K. Nath, *Ceramic Bulletin*, vol. 65, No. 5, Jan. 1986, "A Method for Strengthening Silica Fiber," pp. 752-754.

Primary Examiner—John D. Lee
Assistant Examiner—Robert E. Wise
Attorney, Agent, or Firm—Martin I. Finston; Eugen E. Pacher

[57] ABSTRACT

A silica-based optical fiber is provided, which has improved resistance to static fatigue. The fiber includes an outer layer of modified, fused silica which contains zirconia and, optionally, alumina.

18 Claims, 3 Drawing Sheets

FATIGUE RESISTANT OPTICAL FIBER

FIELD OF THE INVENTION

This invention relates to the field of silica-based optical fibers, and more particularly to those fibers that have improved resistance to static fatigue.

BACKGROUND OF THE INVENTION

It has long been known that silica-based optical fibers are susceptible to stress-assisted corrosion, also known as static fatigue, when the fiber is under stress in the presence of moisture. One approach to this problem has been to manufacture fiber having an outer layer which is under relatively high compressive stress. A stronger fiber is believed to result from such built-in stress. A method for making such fibers is disclosed, for example, in U.S. Pat. No. 4,243,298, issued on Jan. 6, 1981, to C. K. Kao, et al.

Optical fibers having high-compression outer layers may have certain disadvantages. For example, fiber joints are conventionally made in an operation which includes the cleaving of the fiber ends that are to be joined. A predetermined tension is applied to each fiber by the cleaving machine in order to fracture the fiber at a desirable cleave angle, i.e., an angle which is preferably 0.0°, but which is more typically about 0.25°. It has been observed that in order to produce a desirable cleave angle in a fiber having a high-compression outer layer, the cleaving tension must be increased. This requirement is undesirable, because the extra step that is entailed is inconvenient for workmen making field installations, increases the cost of such installations, and increases the likelihood of error.

Practitioners have hitherto failed to provide a silica-based optical fiber having a modified outer glass layer which offers improved resistance to static fatigue, but which is not in substantially higher compression than other regions of the fiber.

SUMMARY OF THE INVENTION

We have discovered a modified, silica glass composition which offers improved resistance to static fatigue. Accordingly, the invention, in one aspect, is a silica-based optical fiber which includes a modified silica-based outer layer, wherein the composition of the outer layer includes zirconia and, optionally, alumina. The outer layer is substantially free of residual, compressive stress. (It should be noted in this regard that a method for making silica-based optical fiber codoped with zirconia and alumina is described in U.S. Pat. No. 4,666,247, issued to J. B. MacChesney, et al., on May 19, 1987. However, that patent does not address the problem of static fatigue.)

The fiber is exemplarily manufactured by drawing fiber from a solid, rod-like preform. According to an exemplary embodiment, the preform includes at least one outer portion of silica-based glass. Before the fiber is drawn, an outer glass layer which comprises silica doped with zirconia and, optionally, alumina is formed on the outer surface of the preform. The amount of zirconia is effective for producing, in the resulting fiber, a stress corrosion parameter of 30 or more. The zirconium atomic number density in the outer layer, expressed as a fraction of the silicon density, is at least about 0.5% but not more than about 8%. If alumina is present, the aluminum density, similarly expressed, does not exceed about 15%. Alumina is added in order to suppress crystallization in the outer layer, and the amount used should be effective for this purpose.

In a currently preferred embodiment, the outer layer is formed initially as a particulate layer which is then sintered to form the glass layer.

DETAILED DESCRIPTION

Figure 1:
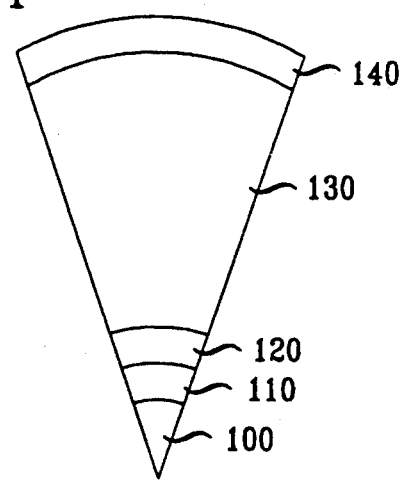
FIG. 1 is a schematic, cross sectional end view of an exemplary optical fiber made according to the invention.

The inventive fiber may be a single or multiple mode fiber having a core and a cladding, and having any of a broad range of dimensions. The only essential limitation in this regard is that at least an outer portion of the cladding should be made of silica-based glass, for example, glass which contains at least about 80% silicon dioxide by weight. The improved resistance to static fatigue which is the object of this invention is provided by forming an outer glass layer which comprises silica that is doped with zirconia and, optionally, alumina. This outer layer is typically about 1-5 μm thick. The surface of the resulting fiber may be in tension because of the contraction of the outer layer when it is formed and cooled. This will tend to occur, for example, when the underlying cladding consists of substantially pure silica. In order to avoid excessive tension, and also in order to assure that the glass of the outer layer will be homogeneous, it is desirable to limit the ratio of the number density of zirconium atoms to the number density of silicon atoms (hereafter denoted Zr:Si) in the outer layer to about 8% or less, and to limit the analogous aluminum-to-silicon ratio, Al:Si, to about 15% or less. Although higher levels may be useful in some cases, it is generally preferable to limit the total of Zr:Si plus Al:Si to about 12% or less, and more preferably to about 10% or less. Alumina is a useful co-dopant for the purpose of enhancing the solubility of zirconia in the host silica glass. In practice, it is generally desirable to determine, first, the desired doping level of zirconia. Alumina should then be included in an amount sufficient to assure the solubility of the zirconia in the desired concentration. Incorporation of excessive alumina should be avoided because it may tend to weaken the resulting fiber.

The amount of zirconia should be effective for raising the value of n of the resulting fiber to 30 or more. The parameter n is the "stress corrosion parameter." It is defined with reference to static stress tests, discussed below, in which the mean time to failure, $t_f$, is determined as a function of the applied tension $\sigma$. The results of such tests generally obey an equation of the form $t_f = k\sigma^{-n}$, where k is an empirically determined constant.

We have observed that adding as little as 0.5% zirconia (i.e., Zr:Si=0.5%) or even less to pure silica can increase n from about 22 to about 30 or more. We have observed such an increase both with and without the concurrent addition of alumina to the glass. Significantly, doping with zirconia (and optionally, with alumina) provides values of n of 30 or more without placing the fiber under a substantial amount of compression. Instead, such doping has been observed to be neutral with respect to residual stress, or, as noted, may tend to contribute a modest amount of residual, tensile, stress in the outer glass layer (i.e., in layer 140 of FIG. 1).

One currently preferred outer-layer composition consists of silica which is undoped with alumina, and doped with zirconia to a Zr:Si value of about 2%. This composition has been observed to exhibit an n of 36 in static stress tests.

One widely used method for evaluating the resistance of the inventive fiber to static fatigue is provided by a standard two-point bend test for fatigue, in 90° C. deionized water. (Such a test is hereafter referred to as the Standard Fatigue Test.) As described below representative samples of the inventive fiber were subjected to the Standard Fatigue Test as bare fibers (i.e., there was no polymer jacket). The samples were observed to survive the Standard Fatigue Test, on average, for more than $10^6$ seconds at 500 ksi (3.44 GPa). By comparison, standard silica fiber exhibited the same initial strength as the inventive fiber (i.e., about 800 ksi, or 5.52 GPa), but was observed to survive the Standard Fatigue Test for $10^6$ seconds only at 385 ksi (2.65 GPa) or less.

With reference to FIG. 1, the inventive fiber in one embodiment includes core 100, cladding 110, fused silica layer 120, fused silica layer 130, and anti-fatigue layer 140. According to an exemplary procedure, glass layers corresponding, respectively, to the cladding and the core are first formed on the inner surface of a fused silica substrate tube by well-known MCVD methods. The substrate tube is collapsed, again by well-known methods, to form the inner portion of a fiber preform. The glass of the substrate tube corresponds to layer 120 of the ultimate fiber. The collapsed tube is placed within a second, fused silica tube, here referred to as the overcladding tube. The overcladding tube is then collapsed, exemplarily by heating it with oxyhydrogen torches on a vertical glass lathe, to form a solid, rod-like preform. The glass of the overcladding tube corresponds to layer 130.

Figure 2:
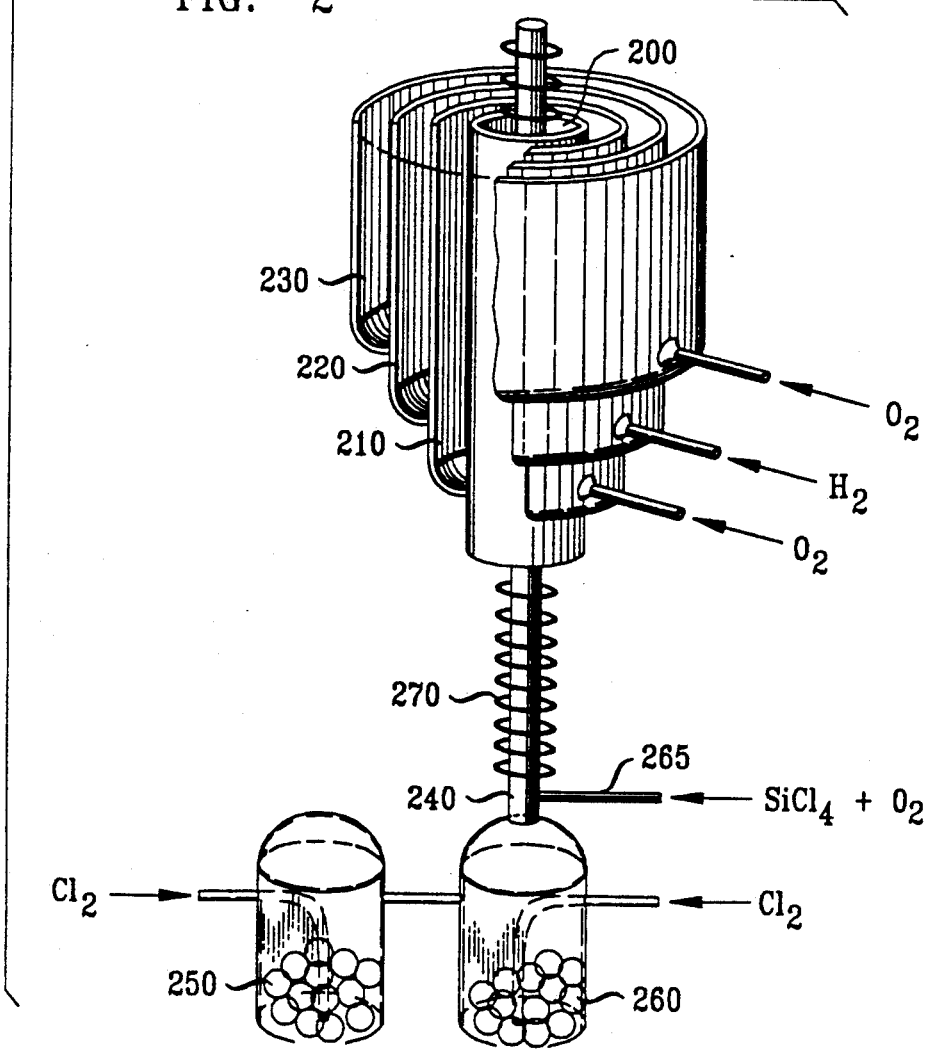
FIG. 2 is a schematic drawing of a conventional torch which may be useful for manufacturing the inventive fiber, in one embodiment.

The material of the anti-fatigue layer is then applied. According to a currently preferred embodiment, the material is applied in particulate form, and is subsequently sintered to convert it to pore-free glass. The anti-fatigue layer typically contributes about 3%–15% of the total glass in the ultimate fiber. According to one useful technique, the material is applied using a VAD torch of conventional design. With reference to FIG. 2, an appropriate such torch has a central orifice 200 and at least three concentric, annular passages numbered in the figure, from the innermost passage, 210, 220, and 230, respectively. As in conventional VAD processing, oxygen flows through passages 210 and 230, and hydrogen flows through passage 220. Also as in conventional VAD processing, a silica-containing gas, which comprises a mixture of oxygen and silicon tetrachloride, flows through the central orifice. However, in a departure from conventional VAD processing, the delivery end of injector tube 240 is inserted into the orifice for delivering the dopant material to the torch flame. The silica-containing gas is typically introduced by flowing it through port (or side-tube) 265 into tube 240.

Reservoirs 250 and 260 are provided, respectively, for metallic aluminum and zirconium in the form of shot or wire. The metals in reservoirs 250 and 260 are heated to at least 300° C., and preferably to about 350° C., and chlorine gas is directed in separate streams over the respective metals. The metal-laden gas streams are combined and directed into injector tube 240, which extends to the outlet of orifice 200 and into the torch flame. In order to prevent condensation of zirconium tetrachloride on the inner walls of tube 240, the tube is wrapped with nichrome heating wire 270 and maintained at an effective temperature to prevent such condensation.

In an alternate, and currently preferred, technique, material containing silicon, zirconium, and (optionally) aluminum is delivered to the torch as an aerosol, rather than as chloride vapors. The alternate embodiment is currently preferred because it avoids the use of chlorine gas. Chlorine is undesirable because its corrosive properties make it difficult to handle.

According to the preferred embodiment, a sol is prepared by mixing alkoxides of silicon, zirconium, and aluminum with an appropriate solvent. Exemplary alkoxides for this purpose are, respectively, TEOS (tetraethyl orthosilicate), zirconium isopropoxide, and aluminum trisecbutoxide. An appropriate solvent is a mixture of water and an alcohol, exemplarily propanol. In order to prevent inhomogeneities in the resulting glass, the TEOS and the solvent are reacted together to cause hydrolysis before the sol is delivered to the torch. Inhomogeneities could otherwise occur, for example, as a result of reactions between unreacted alkoxides and moisture from by-products of the torch flame. Additionally, desirable complexes are formed when the zirconium and aluminum alkoxides are added to the mixture of TEOS and solvent. Relevant sol-gel chemical methods are well known, and are described, for example, in B. E. Yoldas, *J. Materials Science* 12, (1977) 1203–1208, and B. E. Yoldas, *J. Non-Cryst. Solids* 63, (1984) 145–154.

Figure 3:
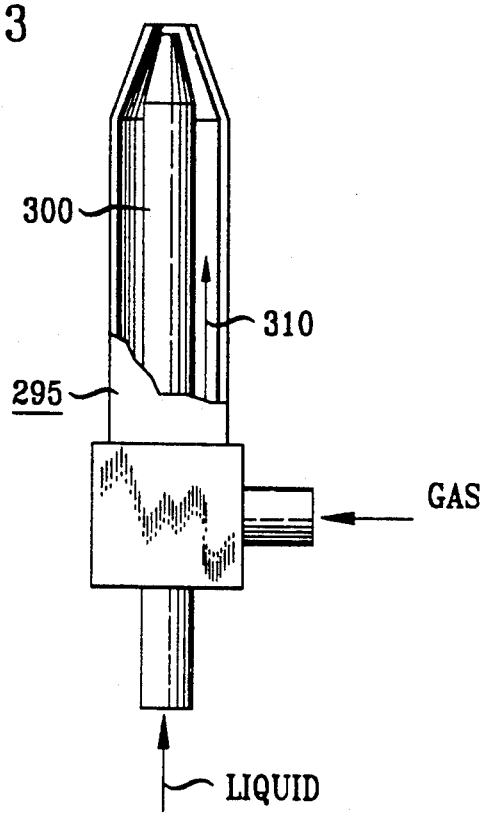
FIG. 3 is a schematic drawing of a conventional aerosol delivery nozzle which may be useful for manufacturing the inventive fiber, in one embodiment.

The sol is delivered to the torch from, e.g., an airbrush-type nozzle 295 as depicted in FIG. 3. The nozzle is used as an injector in a manner which is analogous to the use of injector tube 240 of FIG. 2. The sol flows out through central orifice 300, and gas flows out through annular passage 310. An exemplary gas flow is oxygen at 4 liters per minute.

After the particulate layer has been formed, it is sintered according to well known methods, in order to form a glass layer corresponding to anti-fatigue layer 140 of the ultimate fiber. Fiber is then drawn from the preform according to well known methods.

During the sintering step, some care is necessary in order to prevent crystallization. That is, a separate, zirconia-rich phase tends to crystallize if the glass is heated for too long at too high a temperature. The heating time required to produce this effect grows shorter as the temperature is raised. For example, when glass doped with 5% Zr:Si and 2% Al:Si is heated for more than about ten seconds at 2200° C., a crystallized phase is observed to form upon cooling. At lower torch temperatures, it takes a longer heating period for crystallization to be induced, if at all. This effect can be controlled by judicious selection of the sintering temperature and heating duration. Moreover, co-doping with alumina increases the temperature and duration required to induce crystallization. Thus, for example, if glass doped with 5% Zr:Si and 3% Al:Si is sintered at 2200° C. and permitted to cool, crystallization is easily avoided.

A zirconia-rich phase can also crystallize out when fiber is pulled from the preform. Rapid quenching of the pulled fiber tends to inhibit crystallization. However, the residence time of the glass in the furnace is typically comparable to the sintering times which tend to promote crystallization. As a consequence, the advantage of rapid quenching may be at least partially canceled, and crystallization may occur, causing the resulting fiber to be weakened. Crystallization during fiber pull can be avoided by including an effective amount of alumina as a dopant. The minimum amount that is effective depends upon the zirconia content of the glass.

Figure 4:
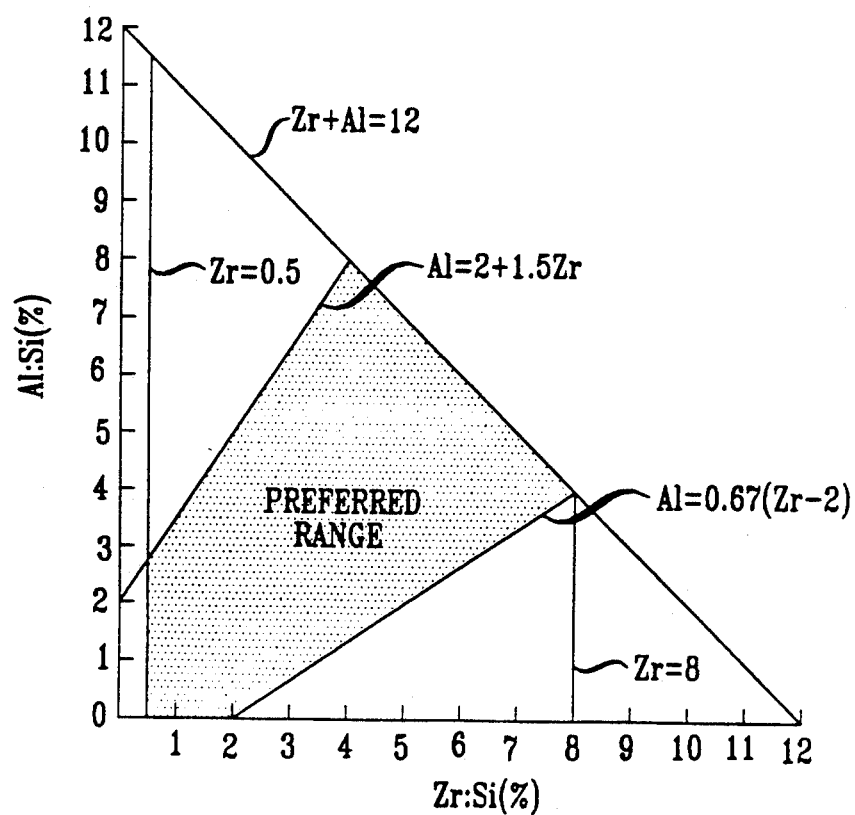
FIG. 4 is a map in a two-dimensional space which represents doping levels of alumina and zirconia in an outer glass layer made according to the invention. Indicated on the map is the region which represents preferred compositions.

FIG. 4 depicts the preferred range for zirconia and alumina doping levels. As indicated, Zr:Si is at least about 0.5%, and the sum of Zr:Si plus Al:Si is less than or equal to about 12%. The minimum alumina content rises linearly with zirconia content (in excess of Zr:Si of about 2%) with a slope of about 0.67. The maximum alumina content (in excess of Al:Si of about 2%) rises linearly with a slope of about 1.5.

EXAMPLE I

A preform, 16 mm in (outer) diameter, was made by collapsing a fused silica substrate tube and a surrounding fused silica overcladding tube, as described above. The material of the anti-fatigue layer was then applied in particulate form using a VAD torch, as described above. With reference to FIG. 2, the oxygen flow was 6 liters per minute in annulus 210, and 15 liters per minute in annulus 230. The hydrogen flow in annulus 220 was 20 liters per minute.

A reactant gas mixture was provided by bubbling oxygen, at a rate of 150 SCCM, through silicon tetrachloride at a temperature of 36° C. (This provided a calculated silica delivery rate of 0.36 g/minute.) The bubbled oxygen, together with a flow of helium at 900 SCCM, was introduced through port 265. Chlorine was flowed at a rate of 2.9 SCCM over metallic zirconium in reactor 260, and from there into tube 240. (This provided a calculated zirconium tetrachloride delivery rate of 0.014 g/minute.) Aluminum reactor 250 was not used. The resulting value of Zr:Si was about 1%.

In order to incorporate aluminum, the resulting particulate layer was soaked in a solution of 18.7 g hydrated aluminum nitrate ($Al(NO_3)_3.9H_2O$) in a mixture of 100 ml acetone and 20 ml deionized water. The resulting value of Al:Si was about 1%.

The layer was then dried and sintered as described above. The fully sintered layer was 0.2 mm thick on the 16-mm preform. A fiber having an outer diameter of 125 $\mu$m was then conventionally drawn in air. The antifatigue layer on the drawn fiber was 1.5 $\mu$m thick.

Figure 5:
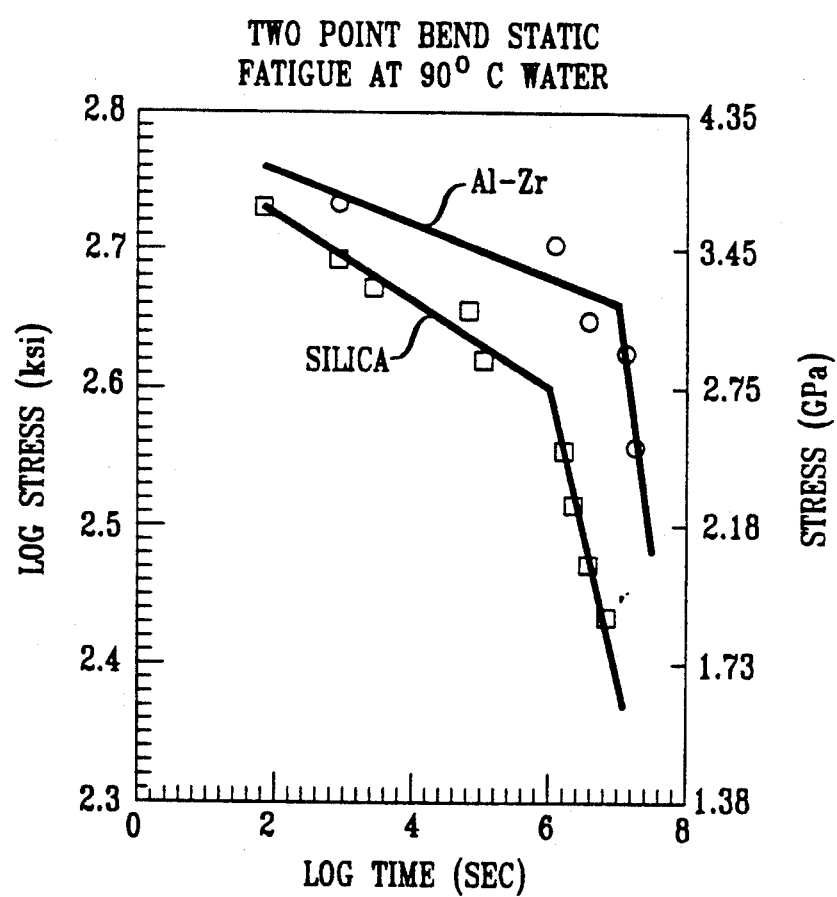
FIG. 5 is a graph which compares the performance, in a Standard Fatigue Test, of an exemplary, inventive fiber with that of a conventional, pure silica fiber.

The bare fiber was subjected to a standard two-point bend test in 90° C. deionized water (referred to herein as the Standard Fatigue Test). The results of the test are depicted in FIG. 5, together with corresponding test results for a conventional, pure silica fiber of the same outer diameter. As noted, above, both fibers exhibited the same initial strength of about 800 ksi (5.5 GPa). However, the inventive fiber survived for more than $10^6$ seconds at 500 ksi (3.4 GPa), whereas the conventional silica fiber survived for $10^6$ seconds only at 385 ksi (2.7 GPa) or less.

EXAMPLE II

A preform was prepared as in Example I. A particulate layer was deposited and sintered as in Example I, but a different reactant gas mixture was flowed into injector 240, and the gas mixture included separate streams of chlorine flowed, respectively, over metallic zirconium and metallic aluminum. The gas mixture consisted of oxygen at 450 SCCM, silicon tetrachloride at 450 SCCM (corresponding to a calculated silica delivery rate of 1.1 g/minute), chlorine flowed over zirconium at 12.8 SCCM (corresponding to a calculated zirconium tetrachloride flow rate of 0.062 gram/minute), and chlorine flowed over aluminum at 5.2 SCCM (corresponding to a calculated aluminum trichloride flow rate of about 0.019 gram/minute). This produced a Zr:Si ratio of about 1.5% and an Al:Si ratio of about 0.8%. The resulting particulate layer was sintered, and fiber was drawn, as in Example I.

The drawn fiber was subjected to dynamic fatigue measurements. (Such measurements are described, for example, in D. Inniss and J. T. Krause, "Hermetic Splice Overcoating," *Optical Engineering* 30 (June 1991) 776–779.) A dynamic n value of 35 was obtained.

EXAMPLE III

A preform was prepared as in Example I. A particulate layer was deposited and sintered as in Example I, but a liquid spray, rather than a gas mixture, was injected into orifice 200 of the torch. The preparation of the liquid reactant mixture is now described: A mixture was first prepared of 52 g TEOS (tetraethyl orthosilicate), 4.4 g deionized water, 10 g propanol, and 2 drops of hydrochloric acid. The mixture was refluxed for 1 hour. There was then added to the mixture 1.64 g zirconium isopropoxide. The mixture was stirred and heated for 30 minutes at 60° C. The mixture was then pumped into the torch at a flow rate of 5 gram/minute to deposit particulate soot which was subsequently sintered as described above. The resulting outer glass layer had a Zr:Si ratio of about 2% and no alumina doping. (In an alternate procedure, 1.23 g aluminum trisecbutoxide was added together with the zirconium isopropoxide, resulting in a fiber having 2% each Zr:Si and Al:Si.)

The fibers which are currently preferred are made by this method, and have 2% Zr:Si with no alumina doping in the outer layer. Static stress testing of such fibers produced no failures after 90 days at a stress level of 440 ksi (3.04 GPa).

We claim:

1. An optical fiber having a core and a cladding surrounding the core, at least a first portion of the cladding comprising silica-based glass, wherein:
   a) the cladding has at least one outer layer which surrounds the first portion;
   b) the outer layer is doped with a dopant composition comprising at least one metal oxide; and
   c) the dopant composition is effective for producing, in the resulting fiber, a stress corrosion parameter of 30 or more, without producing, in the resulting fiber, a residual, compressive stress.

2. The optical fiber of claim 1, wherein the dopant composition comprises zirconia.

3. The optical fiber of claim 2, wherein the zirconia is present in an amount such that the ratio of the number density of zirconium atoms in the outer layer to the number density of silicon atoms, to be referred to as "Zr:Si", is at least about 0.5% and not more than about 8%.

4. The optical fiber of claim 2, wherein the dopant composition further comprises alumina.

5. The optical fiber of claim 4, wherein the alumina is present in an amount adapted such that the outer layer is substantially free of crystallization, and the ratio of the number density of aluminum atoms in the outer layer to the number density of silicon atoms, to be referred to as "Al:Si", is about 15% or less.

6. The optical fiber of claim 5, wherein the zirconia is present in an amount such that the ratio of the number density of zirconium atoms in the outer layer to the number density of silicon atoms, to be referred to as "Zr:Si", is at least about 0.5% and not more than about 8%.

7. The optical fiber of claim 6, wherein the sum of Zr:Si plus Al:Si is not more than about 12%.

8. The optical fiber of claim 7, wherein Zr:Si is greater than 2%, and Al:Si is at least about 0.67 times the excess of Zr:Si over 2%.

9. The optical fiber of claim 8, wherein Al:Si is at most about 2% plus 1.5 times Zr:Si.

10. A method for manufacturing an optical fiber including the step of drawing fiber from a solid, rod-like preform which comprises at least one outer portion of silica-based glass, the outer portion having an outer surface, the method comprising, before the drawing step, the steps of:
   a) depositing a particulate layer on the outer surface, the particulate layer comprising silica doped with a dopant composition which comprises at least one metal oxide; and
   b) sintering the particulate layer to form an outer glass layer on the preform; wherein
   c) the dopant composition is effective for producing, in the resulting fiber, a stress corrosion parameter of 30 or more, without producing, in the resulting fiber, a residual, compressive stress.

11. The method of claim 10, wherein the dopant composition comprises zirconia.

12. The method of claim, 11 wherein the zirconia is present in an amount such that the ratio of the number density of zirconium atoms in the outer layer to the number density of silicon atoms, to be referred to as "Zr:Si", is at least about 0.5% and not more than about 8%.

13. The method of claim 11, wherein the dopant composition further comprises alumina.

14. The method of claim 13, wherein the alumina is present in an amount adapted such that the outer layer is substantially free of crystallization, and the ratio of the number density of aluminum atoms in the outer layer to the number density of silicon atoms, to be referred to as "Al:Si", is about 15% or less.

15. The method of claim 13, wherein the depositing step comprises:
   a) injecting into a torch a sol which comprises alkoxides of silicon, zirconium, and aluminum; and
   b) depositing from the torch a soot layer formed by flame hydrolysis.

16. The method of claim 14, wherein the zirconia is present in an amount such that the ratio of the number density of zirconium atoms in the outer layer to the number density of silicon atoms, to be referred to as "Zr:Si", is at least about 0.5% and not more than about 8%.

17. The method of claim 11, wherein the depositing step comprises:
   a) injecting into a torch a sol which comprises alkoxides of silicon and zirconium; and
   b) depositing from the torch a soot layer formed by flame hydrolysis.

18. The method of claim 10, wherein the depositing step comprises depositing a soot layer from a torch by flame hydrolysis.

* * * * *